United States Patent
Boyle et al.

(10) Patent No.: US 8,706,985 B1
(45) Date of Patent: *Apr. 22, 2014

(54) SYSTEM AND METHOD FOR OPTIMIZING GARBAGE COLLECTION IN DATA STORAGE

(71) Applicant: Western Digital Technologies, Inc., Irvine, CA (US)

(72) Inventors: William B. Boyle, Lake Forest, CA (US); Robert M. Fallone, Newport Beach, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/948,495

(22) Filed: Jul. 23, 2013

Related U.S. Application Data

(63) Continuation of application No. 12/827,931, filed on Jun. 30, 2010, now Pat. No. 8,521,972.

(51) Int. Cl.
G06F 12/00 (2006.01)
G06F 12/02 (2006.01)
G06F 12/10 (2006.01)

(52) U.S. Cl.
CPC .... *G06F 12/0253* (2013.01); *G06F 2212/7205* (2013.01)
USPC ........... 711/159; 711/103; 711/170; 711/206; 711/104; 711/E12.001; 711/E12.009; 711/E12.059

(58) Field of Classification Search
None
See application file for complete search history.

(56) References Cited

U.S. PATENT DOCUMENTS

| 5,530,850 | A | 6/1996 | Ford et al. |
| 5,551,003 | A | 8/1996 | Mattson et al. |
| 5,604,902 | A | 2/1997 | Burkes et al. |
| 5,734,861 | A | 3/1998 | Cohn et al. |
| 5,799,185 | A | 8/1998 | Watanabe |
| 5,819,290 | A | 10/1998 | Fujita |
| 5,819,310 | A | 10/1998 | Vishlitzky et al. |
| 6,067,199 | A | 5/2000 | Blumenau |
| 6,125,434 | A | 9/2000 | Willard et al. |
| 6,324,631 | B1 | 11/2001 | Kuiper |
| 6,430,663 | B1 | 8/2002 | Ding |
| 6,493,160 | B1 | 12/2002 | Schreck |
| 6,711,660 | B1 | 3/2004 | Milne et al. |

(Continued)

FOREIGN PATENT DOCUMENTS

WO 99/10812 A1 3/1999

OTHER PUBLICATIONS

Office Action dated Nov. 27, 2012 in U.S. Appl. No. 12/827,931 32 pages.

(Continued)

*Primary Examiner* — Kevin Verbrugge

(57) ABSTRACT

The present invention is directed to systems and methods for optimizing garbage collection in data storage. The data storage may be a shingled disk drive or a non-volatile solid-state memory device. Garbage collection is optimized by selectively saving data read from certain locations of the data storage in response to host read commands and using the saved data for subsequent garbage collection operations. The decision of whether to save data may be based on a number of criteria, including whether the data is located in an area of the data storage that is due to be garbage collected in the near future. In this manner, certain garbage collection operations can be performed without having to re-read the saved data.

14 Claims, 6 Drawing Sheets

(56) References Cited

U.S. PATENT DOCUMENTS

| | | |
|---|---|---|
| 6,854,022 B1 | 2/2005 | Thelin |
| 6,978,283 B1 | 12/2005 | Edwards et al. |
| 7,124,272 B1 | 10/2006 | Kennedy et al. |
| 7,146,525 B2 | 12/2006 | Han et al. |
| 7,149,822 B2 | 12/2006 | Edanami |
| 7,315,917 B2 | 1/2008 | Bennett et al. |
| 7,363,421 B2 | 4/2008 | Di Sena et al. |
| 7,373,477 B2 | 5/2008 | Takase et al. |
| 7,409,522 B1 | 8/2008 | Fair et al. |
| 7,424,498 B1 | 9/2008 | Patterson |
| 7,443,625 B2 | 10/2008 | Hamaguchi et al. |
| 7,447,836 B2 | 11/2008 | Zhang et al. |
| 7,516,355 B2 | 4/2009 | Noya et al. |
| 7,519,639 B2 | 4/2009 | Bacon et al. |
| 7,552,282 B1 | 6/2009 | Bermingham et al. |
| 7,567,995 B2 | 7/2009 | Maynard et al. |
| 7,593,975 B2 | 9/2009 | Edwards et al. |
| RE41,011 E | 11/2009 | Han et al. |
| 7,624,137 B2 | 11/2009 | Bacon et al. |
| 7,685,360 B1 | 3/2010 | Brunnett et al. |
| 7,707,166 B1 | 4/2010 | Patterson |
| 7,721,059 B2 | 5/2010 | Mylly et al. |
| 7,783,682 B1 | 8/2010 | Patterson |
| 8,359,430 B1 | 1/2013 | Fair |
| 8,521,972 B1 | 8/2013 | Boyle et al. |
| 2002/0138694 A1 | 9/2002 | Isshiki |
| 2002/0188800 A1 | 12/2002 | Tomaszewski et al. |
| 2003/0051110 A1 | 3/2003 | Gaspard et al. |
| 2003/0101383 A1 | 5/2003 | Carlson |
| 2004/0179386 A1 | 9/2004 | Jun |
| 2004/0268079 A1 | 12/2004 | Riedle et al. |
| 2005/0021900 A1 | 1/2005 | Okuyama et al. |
| 2005/0071537 A1 | 3/2005 | New et al. |
| 2005/0216657 A1 | 9/2005 | Forrer et al. |
| 2006/0020849 A1 | 1/2006 | Kim |
| 2006/0106981 A1 | 5/2006 | Khurshudov et al. |
| 2006/0155917 A1 | 7/2006 | Di Sena et al. |
| 2006/0212674 A1 | 9/2006 | Chung et al. |
| 2007/0027940 A1 | 2/2007 | Lutz et al. |
| 2007/0050390 A1 | 3/2007 | Maynard et al. |
| 2007/0198614 A1 | 8/2007 | Zhang et al. |
| 2007/0208790 A1 | 9/2007 | Reuter et al. |
| 2008/0077762 A1 | 3/2008 | Scott et al. |
| 2008/0091872 A1 | 4/2008 | Bennett et al. |
| 2008/0263059 A1 | 10/2008 | Coca et al. |
| 2008/0263305 A1 | 10/2008 | Shu et al. |
| 2009/0049238 A1 | 2/2009 | Zhang et al. |
| 2009/0055450 A1 | 2/2009 | Biller |
| 2009/0094299 A1 | 4/2009 | Kim et al. |
| 2009/0164742 A1 | 6/2009 | Wach et al. |
| 2010/0153347 A1 | 6/2010 | Koester et al. |
| 2010/0287217 A1 | 11/2010 | Borchers et al. |
| 2010/0293354 A1 | 11/2010 | Perez et al. |
| 2011/0231623 A1 | 9/2011 | Goss et al. |
| 2011/0283049 A1 | 11/2011 | Kang et al. |
| 2012/0117322 A1 | 5/2012 | Satran et al. |
| 2012/0173832 A1 | 7/2012 | Post et al. |
| 2013/0107391 A1 | 5/2013 | Springberg et al. |

OTHER PUBLICATIONS

Notice of Allowance dated Apr. 25, 2013 in U.S. Appl. No. 12/827,931, 8 pages.

SYSTEM AND METHOD FOR OPTIMIZING GARBAGE COLLECTION IN DATA STORAGE

CROSS-REFERENCE TO RELATED APPLICATIONS

This application is a continuation of U.S. patent application Ser. No. 12/827,931, filed on Jun. 30, 2010, entitled "SYSTEM AND METHOD FOR OPTIMIZING GARBAGE COLLECTION IN DATA STORAGE," which is hereby incorporated by reference in its entirety.

BACKGROUND

Garbage collection is often performed in data storage devices that implement uni-directional write policies. For example, some non-volatile solid-state memory devices and shingled disk drives both program or write data to the media in one direction, whether the incoming data from the host has random or sequential logical addresses. Because data for logical addresses can be located at any physical location, garbage collection is needed to reclaim locations on the media that no longer contain valid data for future writes. For example, in a shingled disk drive, if a track stores both valid and invalid data, the valid data may be copied by the controller as part of garbage collection to a new location so that the entire track can be made available for future write operations.

BRIEF DESCRIPTION OF THE DRAWINGS

Systems and methods which embody the various features of the invention will now be described with reference to the following drawings, in which.

DETAILED DESCRIPTION

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

Shingled Drive Storage Device

Figure 1:
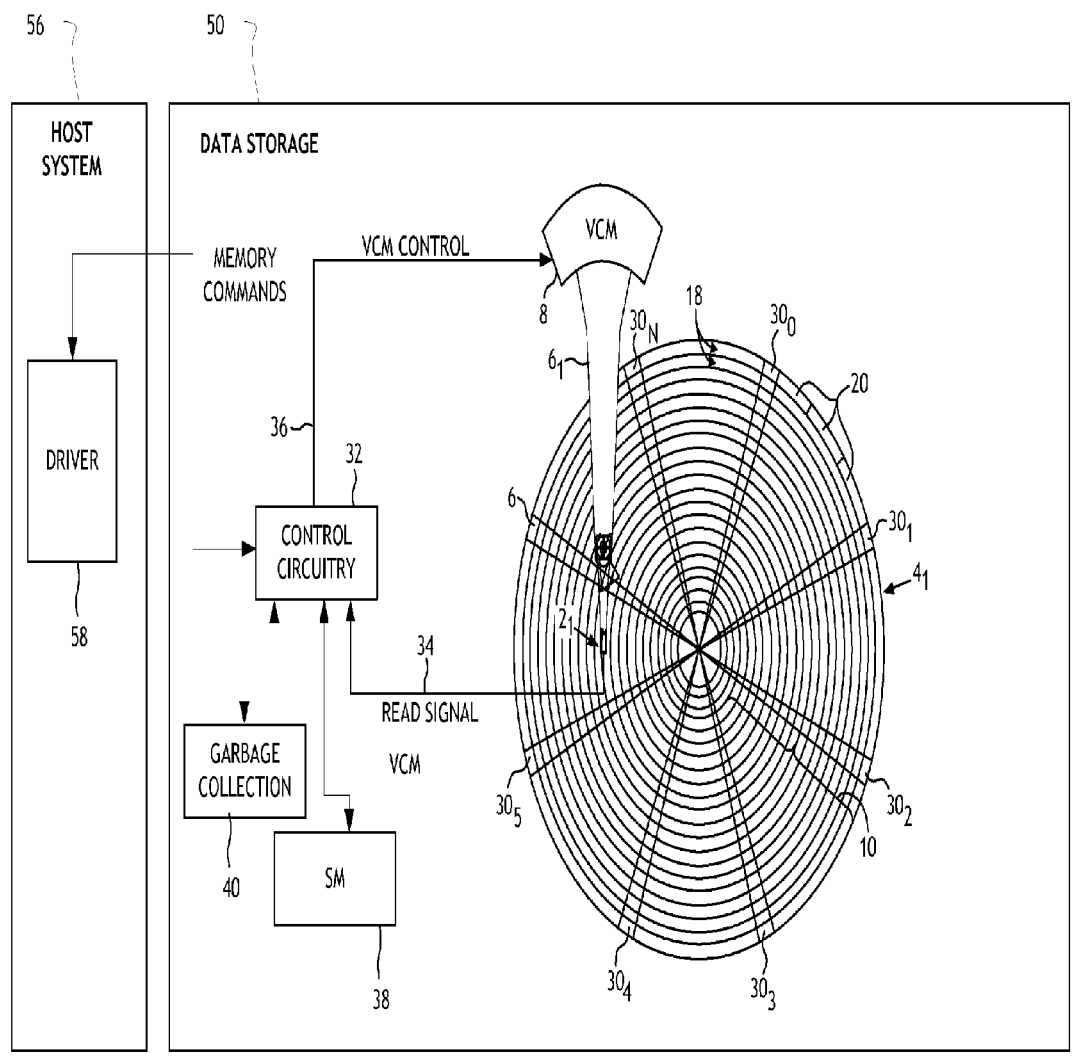
FIG. 1 is a block diagram illustrating a shingled disk storage device according to one embodiment.

FIG. 1 shows a disk-drive based data storage device 50 according to one embodiment. The data storage device 50 includes a head $2_1$ actuated radially over a disk surface $4_1$ by an actuator arm $6_1$, and a voice coil motor (VCM) 8 operable to rotate the actuator arm $6_1$ about a pivot. The disk surface $4_1$ comprises a host addressable area 10 with a plurality of data tracks 18, wherein each data track 18 comprises a plurality of data blocks 20.

In the embodiment in FIG. 1, the disk surface $4_1$ further comprises a plurality of embedded servo sectors $30_1$-$30_N$ that define the data tracks 18 in the host addressable area 10. The data storage device 50 further comprises control circuitry 32, which is operable to process a read signal 34 emanating from the head 21 to demodulate the embedded servo sectors $30_1$-$30_N$ and generate a position error signal (PES). The PES represents a radial offset of the head 21 from a target data track 18 in the host addressable area 10. The control circuitry 32 is further operable to process the PES with a suitable servo compensator to generate a VCM control signal 36 applied to the VCM 8. The VCM 8 rotates the actuator arm 61 about a pivot in order to actuate the head 21 radially over the disk surface $4_1$ in a direction that decreases the PES. The control circuitry 32 is also configured to receive commands from a driver 58 in the host system 56. In one embodiment, the data storage device 50 further comprises a garbage collection module 40 for managing garbage collection operations. In another embodiment, the control circuitry 32 manages garbage collection operations. The management and execution of garbage collection operations will be further described below.

In one embodiment, the data storage device 50 further comprises a semiconductor memory (SM) 38 communicatively coupled to the control circuitry 32. The SM 38 can comprise, for example, dynamic random access memory (DRAM), Flash memory, or static random access memory (SRAM). The SM 38 further comprises a cache for temporarily storing write data received from the host 56 via a write command and read data requested by the host 56 via a read command.

One embodiment of the data storage device 50 is a shingled-based disk drive in which the control circuitry 32 accesses at least part of the storage using log structure writes wherein a band of the data tracks are accessed as a circular buffer. New data is written to the head (current data track), and during a garbage collection operation, valid data is relocated from the tail of the buffer (old data tracks) to the head of the buffer so as to free space for new write data. In the shingled-based disk drive embodiment, data tracks are written in a shingled (overlapping) manner.

Garbage Collection Optimization

Figure 2:
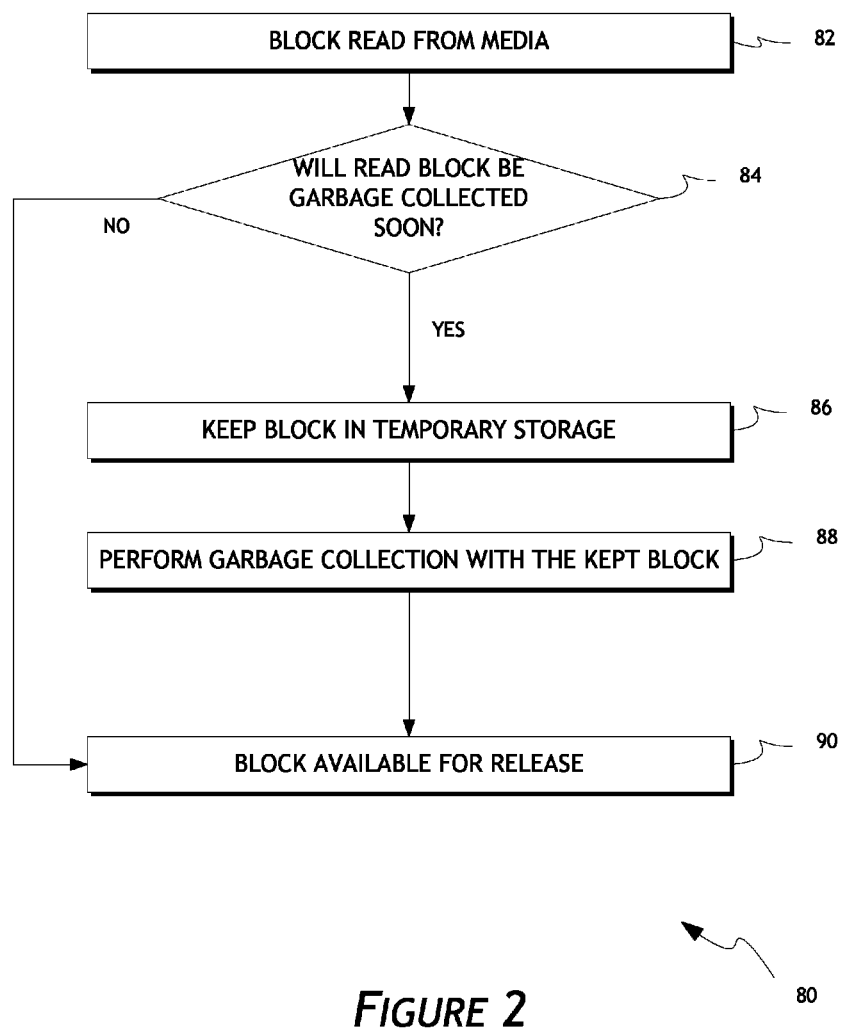
FIG. 2 is a flow diagram showing the process of optimizing garbage collection in accordance with one embodiment.

FIG. 2 is a flow diagram showing a process 80 executed by the garbage collection module 40 and/or the control circuitry 32 to optimize garbage collection in accordance with one embodiment. In block 82, a memory block is read from the media of the data storage (e.g. the shingled disk drive). In one embodiment, the memory block may be read in response to a read command from the host 56. In other embodiments, the memory block may be read in response to other commands generated by the data storage (e.g. wear leveling command if the data storage is a solid-state memory device, as further described below in conjunction with FIG. 6). In block 84, the process 80 determines whether the block that was read will be garbage collected soon. The determination will be further illustrated below in conjunction with FIG. 3. If the read block is determined to be garbage collected soon, the data contents of the read block are stored in a temporary storage in block 86.

In the embodiment of FIG. 1, the contents of the read block may be stored in the semiconductor memory (SM) 38. In one embodiment in which the data storage device includes a read cache (e.g., in the semiconductor memory (SM) 38), data from the read block may be placed in the read cache as part of processing the read command in block 82, or may already exist in the read cache because of a prior read command. In either case, in the embodiment with the read cache, in block 86 the garbage collection module 40 and/or the control circuitry 32 may prevent data from the read block from being flushed from the read cache during the normal read cache flushing cycles. In one embodiment, the data from the read block is tagged with a "dirty" flag/bit that is used by the read cache to mark data that should be retained for later flushing to the disk. In one embodiment, the data from the read block is tagged with a special flag/bit in place of or in addition to the "dirty" flag/bit to enable the read cache to differentiate data from the read block (which will be used for garbage collection) from other data that should be retained for flushing to the disk in the normal course of operation. The read cache may thus implement different flushing policies for the different types of data. Garbage collection is then performed in block 88 with the contents of the read block that was stored in block 86. Once garbage collection is performed, the contents of the read block are made available for release in block 90. In the alternative, if the read block is determined to not be garbage collected soon in block 84, the process 80 skips to block 90, where the contents of the read block are made available for release.

Garbage Collection Examples

Figure 3:
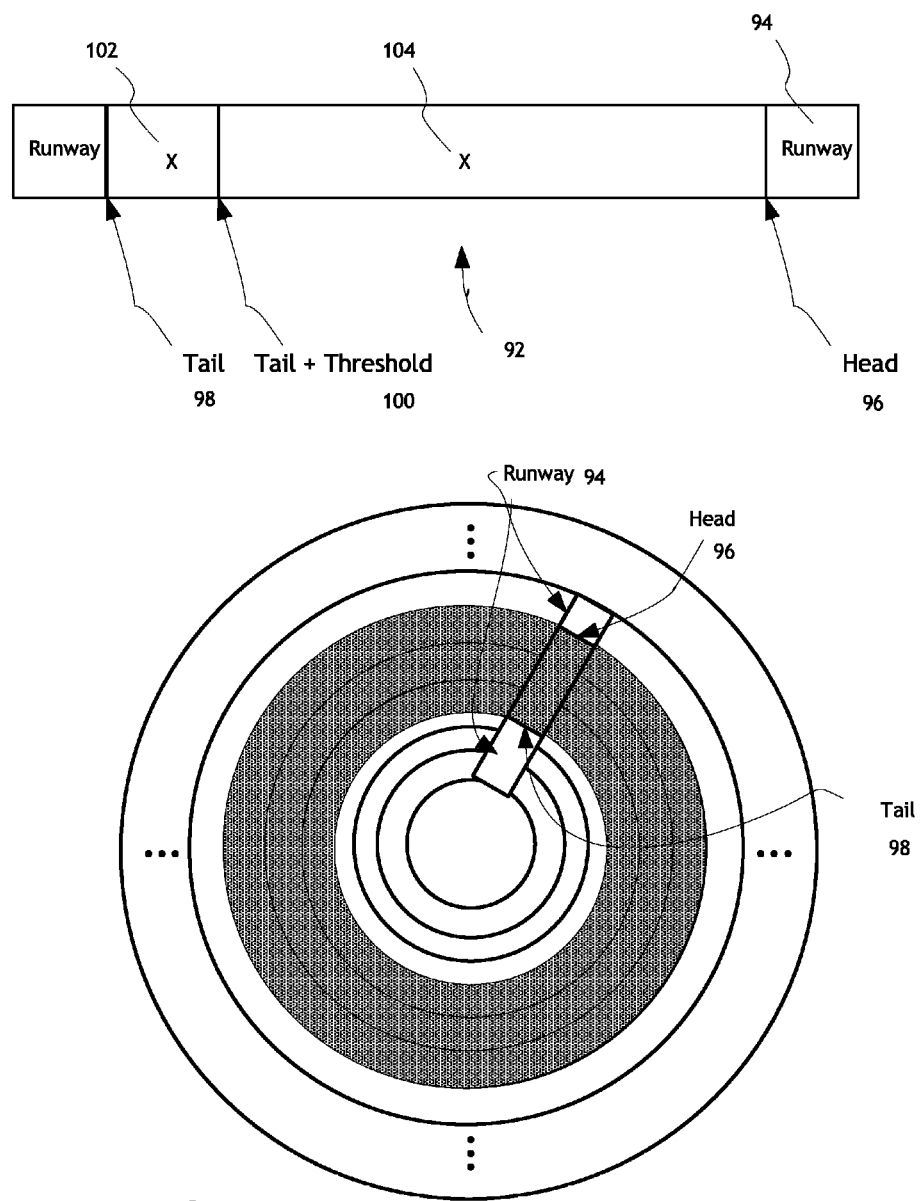
FIG. 3 is a block diagram illustrating an example of optimizing garbage collection on a shingled disk storage device according to one embodiment.

FIG. 3 is a block diagram illustrating an example of optimizing garbage collection on a shingled disk storage device according to one embodiment. Although the example shows data being written to the shingled disk storage device in a circular buffer, the garbage collection optimization embodiments of the invention are applicable to storage devices that implement other data access policies (e.g., zone-based access).

As shown in the example of FIG. 3, and as previously discussed above in conjunction with FIG. 1, data is written to the disk-based storage device 50 in a circular buffer 92 with a head 96 and a tail 98. Data is written in an area between the head and the tail, with new data being written in the direction from the tail toward the head. A runway 94 is shown in the circular buffer 92 after the head 96 and before the tail 98 where new data may be written to without overwriting valid data. In operation, new data is written at the head 98, and the head 98 is moved forward into the runway area 92 after each write in one embodiment. The circular buffer 92 is circular in the sense that the runway spans the area between the head and the tail, and the head is moving toward the tail.

Garbage collection is performed at the tail to prevent the exhaustion of the runway 94. Therefore, data located near the tail has a higher likelihood of being garbage collected in the near future. FIG. 3 shows two example data points 102 and 104. In the determination made in block 84 of FIG. 2, the process 80 determines whether a memory block read from the media should be saved for a later garbage collection operation. In the example of data point 102, the determination would be positive since it falls into a range between the tail and a location of the tail offset by a threshold (tail+threshold). Since data in this range is likely to be needed soon for a garbage collection operation, saving it as part of fulfilling a read operation now (e.g., for a host read command) would eliminate the need to re-read the same data when the garbage collection operation is executed. On the other hand, data point 104 would not be saved for a future garbage collection operation since it falls outside of the range. In one embodiment, the determination needs to be made as there is typically limited space in the temporary storage where data can be saved.

In one embodiment, the threshold is based at least in part on a likelihood that a garbage collection operation will be needed soon. For example, a long runway may mean that garbage collection operation is not likely to be needed soon. Thus, the threshold may be set to be shorter. If the runway is short, then garbage collection is likely to be needed soon, and as a result the threshold may be set to be longer. The threshold may be measured by a number of memory units such as sectors, blocks, or tracks depending on the embodiments. In one embodiment, the threshold may be a fixed number of blocks from the tail, and if the read block falls in the range of the threshold, the read block will be saved for garbage collection. In another embodiment, the number of blocks from the tail may be adjustable, e.g., based on the size of the runway.

In one embodiment, additional data may be saved along with the read block. For example, in a shingled disk drive embodiment, if a host read command results in a read from a block "A," data from the entire track in which block "A" is located may also be read and saved for future garbage collection operations.

In one embodiment, when garbage collection is needed, the read block may not be stored in temporary storage but instead written directly to a new location, such as the head 96, as part of a garbage collection operation. For example, a read command from the host system may trigger a garbage collection operation if the read data is near the tail and the runway 94 is running out of available space. In this case, the data is read from the target block of the read command, together with any adjacent blocks, and returned to the host and then written to a new location as part of a garbage collection operation. In another example, the read block is near the tail 98, so all of the valid blocks from the tail 98 to the read block may be read and moved to the head 96 so that a garbage collection operation can increase the runway 94 while servicing a host command.

Least Recently Used List (LRU)

In one embodiment, each block in the data storage is time-stamped and the control circuitry 32 and/or the garbage collection module 40 is configured to maintain a list of blocks that are least recently used (LRU) (i.e., least recently written). The LRU list may be used to determine whether the data contents of a block should be migrated to another location as part of a garbage collection operation. In one embodiment, the contents of a block that appears on the LRU list are saved for migration. In one embodiment, the contents of a block with a time stamp that meets a minimum LRU criterion are saved for migration.

Zone List

Figure 4:
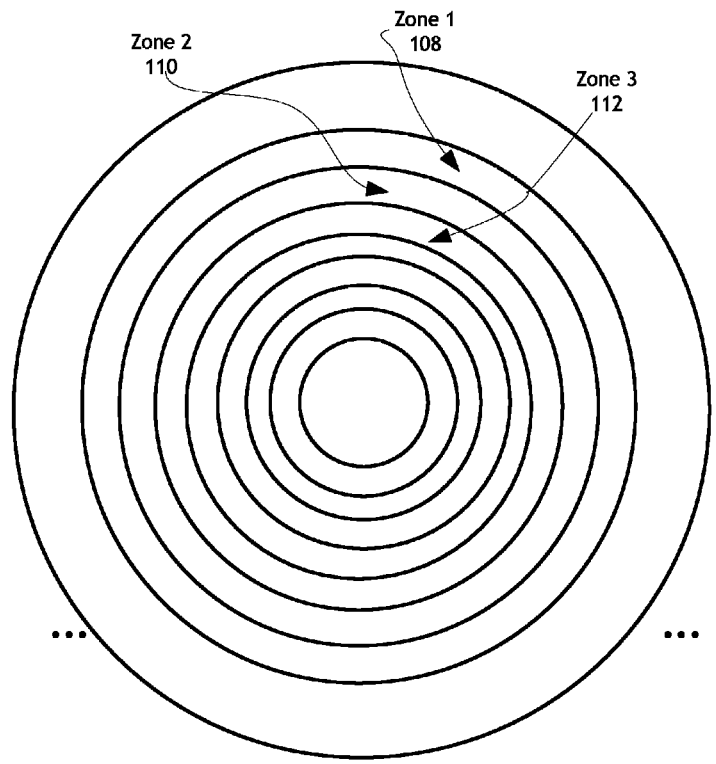
FIG. 4 is a block diagram illustrating a shingled disk storage device with a plurality of zones according to one embodiment.
Figure 4:
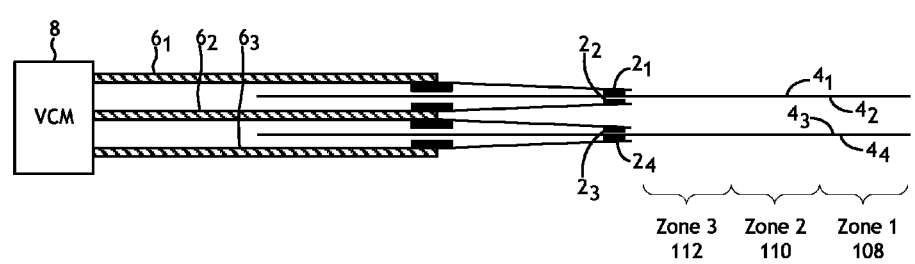

In one embodiment, the data storage device 50 is divided into multiple zones as shown in FIG. 4, including a zone 1 (108), a zone 2 (110), and a zone 3 (112). The control circuitry 32 and/or the garbage collection module 40 are configured to maintain a list of zones, sorted by the numbers of blocks with invalid data within the individual zones. In one embodiment, a list of the top N number of zones is maintained, and data contents of any block from the top N number of zones are saved for future garbage collection operations when they are read pursuant to a read command. In another embodiment, data from any block from a zone with a minimum number of invalid blocks is saved.

In one embodiment, the storage device 50 comprises a plurality of disk surfaces as further shown in FIG. 4. In the embodiment of FIG. 4, a plurality of heads $2_1$-$2_4$ are actuated over respective disk surfaces $4_1$-$4_4$ by a VCM 8 which rotates actuator arms $6_1$-$6_3$ about a pivot. In one embodiment, each of disk surfaces $4_1$-$4_4$ comprises a host addressable area 10 comprising a plurality of data tracks 18. In the embodiment of FIG. 4, a zone may span multiple layers of the disk as shown. For example, zone 1 (108) may span a portion of the disk surfaces $4_1$, $4_2$, $4_3$, and $4_4$ as indicated by the bracket. Similarly, zone 2 (110) may span a portion of the disk surfaces $4_1$, $4_2$, $4_3$, and $4_4$ as indicated by the bracket.

The various afore-mentioned methods of determining whether to keep data read as a part of a read command may be combined. For example, the LRU list may be combined with the list of zones sorted by the number of invalid blocks, so that instead of saving read data from any block from the top zones on the list, the determining process only saves data from those blocks that are listed on the LRU lists for the individual zones. Alternatively, the garbage collection module may garbage collect zones independent of the number of invalid blocks, such as by following a round-robin approach. In this embodiment, the read block may be migrated to another zone if it is determined that the zone the read block is currently located in is close to being next in order for garbage collection. Other garbage collection schemes may be used.

Metadata

Figure 5A:
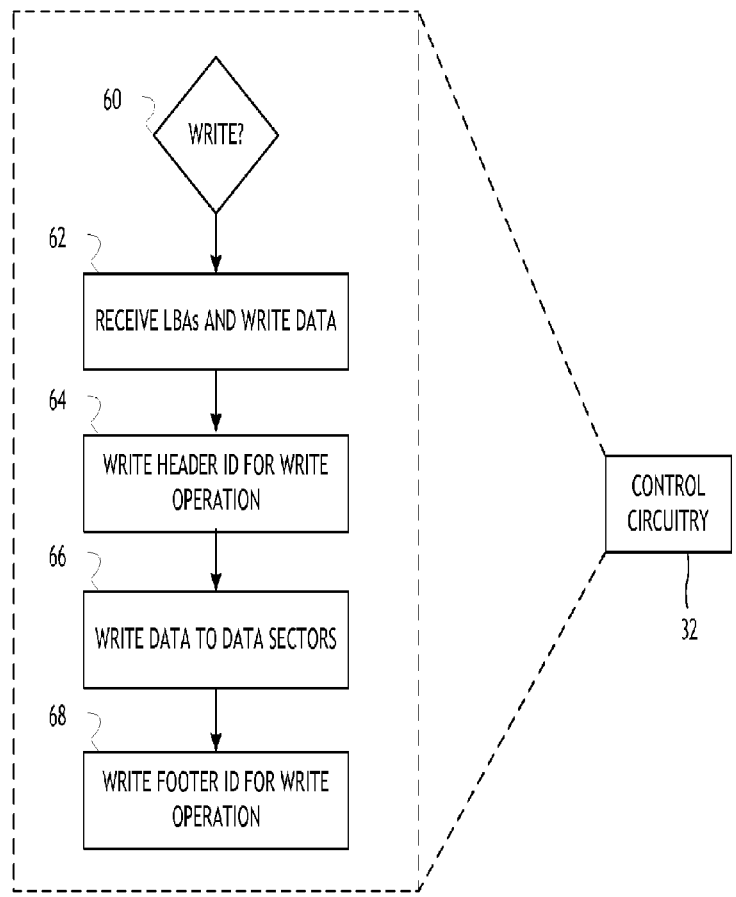
FIG. 5A is a block diagram illustrating the operation of the control circuitry of the shingled disk storage device according to one embodiment.

FIG. 5A further illustrates the functionality of the controller circuitry 32 according to one embodiment. A first write command is received (step 60) identifying a number of logical block addresses (LBAs) and write data (step 62). A header identifier is written to a first data sector that identifies a beginning of the first write command (step 64). The write data is written to a plurality of the data sectors (step 66) and after writing the write data, a footer identifier is written to a second data sector that identifies the end of the first write command (step 68). The LBAs are also written to at least one of the first data sector and the second data sector. The header and footer information will be further illustrated in FIG. 5B.

Figure 5B:
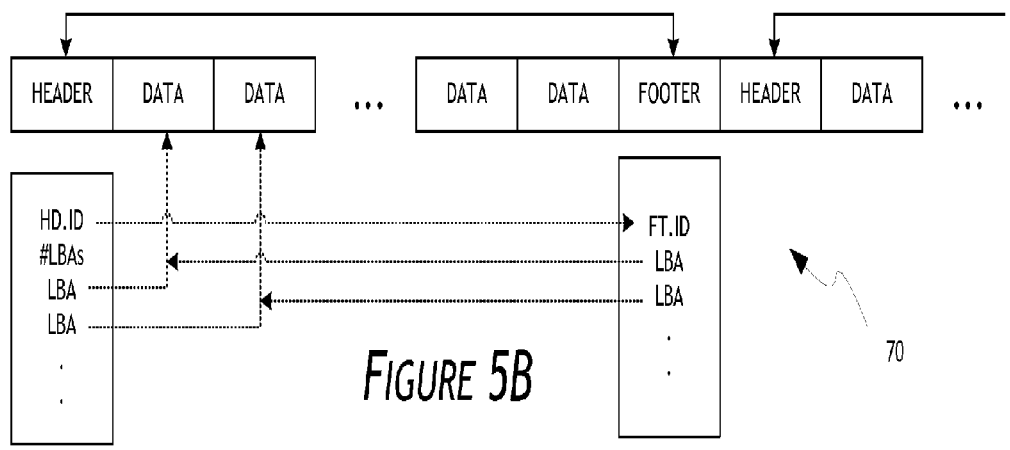
FIG. 5B is a block diagram illustrating how data is written to the shingled disk storage device according to one embodiment.

FIG. 5B illustrates an embodiment of the present invention wherein the LBAs of a write command are written to both a header data sector and a footer data sector, wherein each LBA corresponds to one of the data sectors of the write command. Writing the LBAs to both the header data sector and footer data sector provides redundancy in the event that either the header or footer data is unrecoverable. Also in the embodiment of FIG. 5B, a header identifier (HD.ID) is written to the header data sector together with the number of data sectors written (#LBAs) in the write command. The number of LBAs written is a footer locater that identifies the footer data sector (e.g., the footer data equal the #LBAs plus the physical block address (PBA) of the header data sector). A footer identifier (FT.ID) is written to the footer data sector which provides a verification that the data sector is a valid footer that corresponds to the header (an invalid footer may occur due to a power failure in the middle of a write operation). The metadata in the header and/or footer may contain other information, such as a timestamp. In one embodiment, metadata such as that shown in FIG. 5B is stored in each sector of the disk, rather than being appended as header and footer sectors around user data as shown in FIG. 5B. In another embodiment, metadata associated with user data written to a track is stored in a file on the track. In a hybrid drive embodiment, metadata may be stored in flash memory while user data is stored on the disk.

Solid-State Storage

Figure 6:
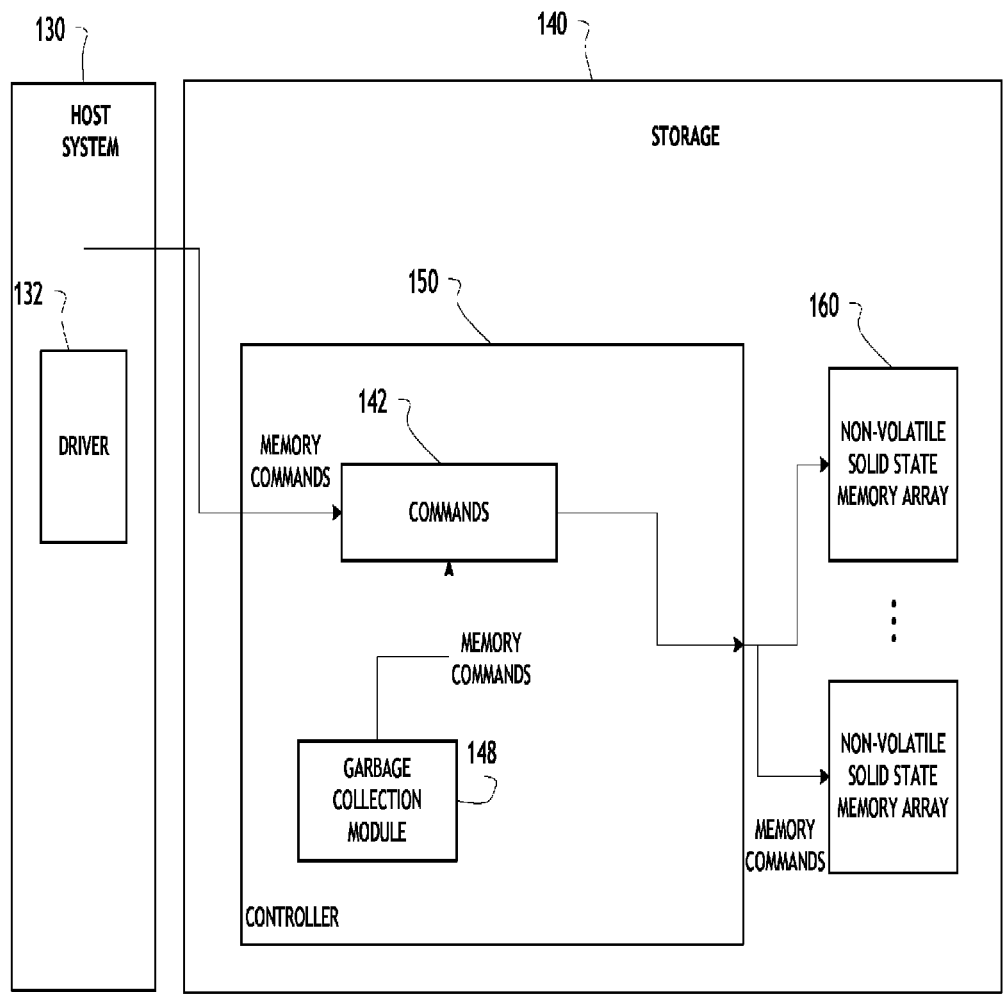
FIG. 6 is a block diagram illustrating a solid-state storage subsystem according to one embodiment.

FIG. 6 is a block diagram illustrating a solid state memory-based data storage device according to one embodiment. As shown, a data storage device 140 includes a controller 150, which in turn includes a command queue 142 and a garbage collection module 148, which is configured to execute the at least some of the garbage collection operations described above. For example, the garbage collection module 148 may perform some or all of the functionalities performed by the garbage collection module 40 of the data storage device 50. The garbage collection module 148 in one embodiment is configured to execute process 80 for each read command received in the command queue 142. In one embodiment, the host command queue 142 receives memory commands from a driver 132 residing within a host system 130, and the memory commands may include write and read commands issued by the host system 130. As further shown in FIG. 6, in one embodiment, the controller 150 executes the commands in the host command queue 142 in one or more non-volatile solid-state memory arrays 160, as well as commands issued by the garbage collection module 148. The commands from the garbage collection module 148 may be stored in the command queue 142 or in a separate queue.

CONCLUSION

The features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A data storage comprising:
control circuitry for reading and writing data in at least a portion of the data storage, the control circuitry configured to:
in response to a read command from a host system, cause data to be read from a physical block address in the data storage and saved in temporary memory;
determine, based at least partly on if the physical block address is located in a zone of the plurality of zones that has a number of invalid blocks that exceeds a minimum invalidity threshold, whether to save data in the temporary memory for subsequent use in performing garbage collection; and
perform a garbage collection operation with the data in the temporary memory.

2. The data storage of claim 1 wherein the data storage device further comprises at least a solid state storage device.

3. The data storage of claim 1 wherein the data storage further comprises at least a disk comprising a plurality of tracks, wherein each track comprises a plurality of data sectors each assigned a physical block address.

4. The data storage of claim 1, wherein the temporary memory comprises a read cache and the control circuitry is further configured to save the data by preventing the data from being flushed from the read cache.

5. The data storage of claim 1, wherein the control circuitry is further configured to read and save additional data from an area in proximity to the physical block address if the data is saved for subsequent use in performing garbage collection.

6. The data storage of claim 1, wherein the temporary memory is stored in flash memory.

7. The data storage of claim 1, wherein the temporary memory is stored in non-volatile memory.

8. A data storage comprising:
control circuitry for reading and writing data in at least a portion of the data storage, the control circuitry configured to:
in response to a read command from a host system, cause data to be read from a physical block address in the data storage and saved in temporary memory;
maintain a list comprising a plurality of zones sorted by a number of blocks with invalid data within each of the plurality of zones;
determine, based at least partly on a location, in the list, of a zone of the plurality of zones comprising the physical block address, whether to save data in the temporary memory for subsequent use in performing garbage collection; and
perform a garbage collection operation with the data in the temporary memory.

9. The data storage of claim 8 wherein the data storage device further comprises at least a solid state storage device.

10. The data storage of claim 8 wherein the data storage further comprises at least a disk comprising a plurality of tracks, wherein each track comprises a plurality of data sectors each assigned a physical block address.

11. The data storage of claim 8, wherein the temporary memory comprises a read cache and the control circuitry is further configured to save the data by preventing the data from being flushed from the read cache.

12. The data storage of claim 8, wherein the control circuitry is further configured to read and save additional data from an area in proximity to the physical block address if the data is saved for subsequent use in performing garbage collection.

13. The data storage of claim 8, wherein the temporary memory is stored in flash memory.

14. The data storage of claim 8, wherein the temporary memory is stored in non-volatile memory.

* * * * *